(12) United States Patent
Motobayashi

(10) Patent No.: US 7,065,088 B2
(45) Date of Patent: Jun. 20, 2006

(54) ASYNCHRONOUS TRANSFER MODE SWITCH WITH FUNCTION FOR ASSIGNING QUEUE HAVING FORWARDING RATE CLOSE TO DECLARED RATE

(75) Inventor: Ryota Motobayashi, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 317 days.

(21) Appl. No.: 10/795,536

(22) Filed: Mar. 9, 2004

(65) Prior Publication Data

US 2004/0170178 A1 Sep. 2, 2004

Related U.S. Application Data

(62) Division of application No. 09/233,084, filed on Jan. 19, 1999, now Pat. No. 6,731,603.

(30) Foreign Application Priority Data

Jan. 19, 1998 (JP) ................................. 10-020129

(51) Int. Cl.
*H04L 12/28* (2006.01)
(52) U.S. Cl. .................................. 370/395.1
(58) Field of Classification Search ...................... None
See application file for complete search history.

(56) References Cited

U.S. PATENT DOCUMENTS

| 5,555,265 | A | 9/1996 | Kakuma et al. |
|---|---|---|---|
| 5,581,544 | A | 12/1996 | Hamada et al. |
| 5,694,554 | A | 12/1997 | Kawabata et al. |
| 5,699,345 | A | 12/1997 | Watanuki et al. |
| 5,748,629 | A | 5/1998 | Caldara et al. |
| 5,982,748 | A | 11/1999 | Yin et al. |
| 6,046,981 | A | 4/2000 | Ramamurthy et al. |
| 6,212,163 | B1 | 4/2001 | Aida |
| 6,731,603 | B1 | 5/2004 | Motobayashi |

FOREIGN PATENT DOCUMENTS

| EP | 0 38 037 A2 | 11/1990 |
|---|---|---|
| JP | 4-177942 A | 6/1992 |
| JP | 5-153155 A | 6/1993 |
| JP | 5-244189 A | 9/1993 |
| JP | 6-30026 A | 2/1994 |
| JP | 7-58748 A | 3/1995 |
| JP | 7-212365 A | 8/1995 |
| JP | 7-212367 | 8/1995 |
| JP | 7-240755 A | 9/1995 |
| JP | 8-125668 A | 5/1996 |
| JP | 8-163145 A | 6/1996 |
| JP | 8-204721 A | 8/1996 |

(Continued)

OTHER PUBLICATIONS

Ramamurthy et al, Multi-Class Connection Admission Control Policy for High Speed ATM Switches, IEEE, pp. 963-973, 1997.*

(Continued)

*Primary Examiner*—Frank Duong
(74) *Attorney, Agent, or Firm*—Harrity Snyder LLP

(57) ABSTRACT

In an asynchronous transfer mode switch, a plurality of queues is provided for accumulating transfer cells, and a queue assignment processing section, receives a message for establishing a connection and assigns to the connection one of the queues having a forwarding rate close to a declared rate included in the message and not exceeding the declared rate.

5 Claims, 10 Drawing Sheets

FOREIGN PATENT DOCUMENTS

| | | |
|---|---|---|
| JP | 8-242238 A | 9/1996 |
| JP | 8-288951 A | 11/1996 |
| JP | 8-331138 A | 12/1996 |
| JP | 10-107803 A | 4/1998 |
| WO | WO 97-43869 A1 | 11/1997 |

OTHER PUBLICATIONS

Saito et al, Satisfying QOS standard with combined strategy for CAC and UPC, IEEE, pp. 965-969, 1995.*

M. Shinohara et al., "Multiclass Large Scale ATM Switch with QoS Guarantee", IEEE, Aug. 1997, pp. 453-461.

Rohit Goyal et al., "UBR+: Improving Performance of TCP over ATM-UBR service", Ohio State University (www.cis.ohio-state.edu/~jain/papers/icc97.ps) Jun. 1997, pp. 1-12.

U.S. Appl. No. 10/795,299, filed Mar. 9, 2004 entitled "Asynchronous Transfer Mode Switch with Function for Assigning Queue Having Forwarding Rate Close to Declared Rate", Ryota Motobayashi, 44 pages.

* cited by examiner

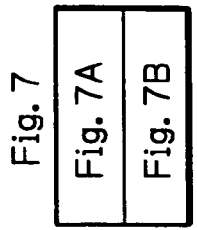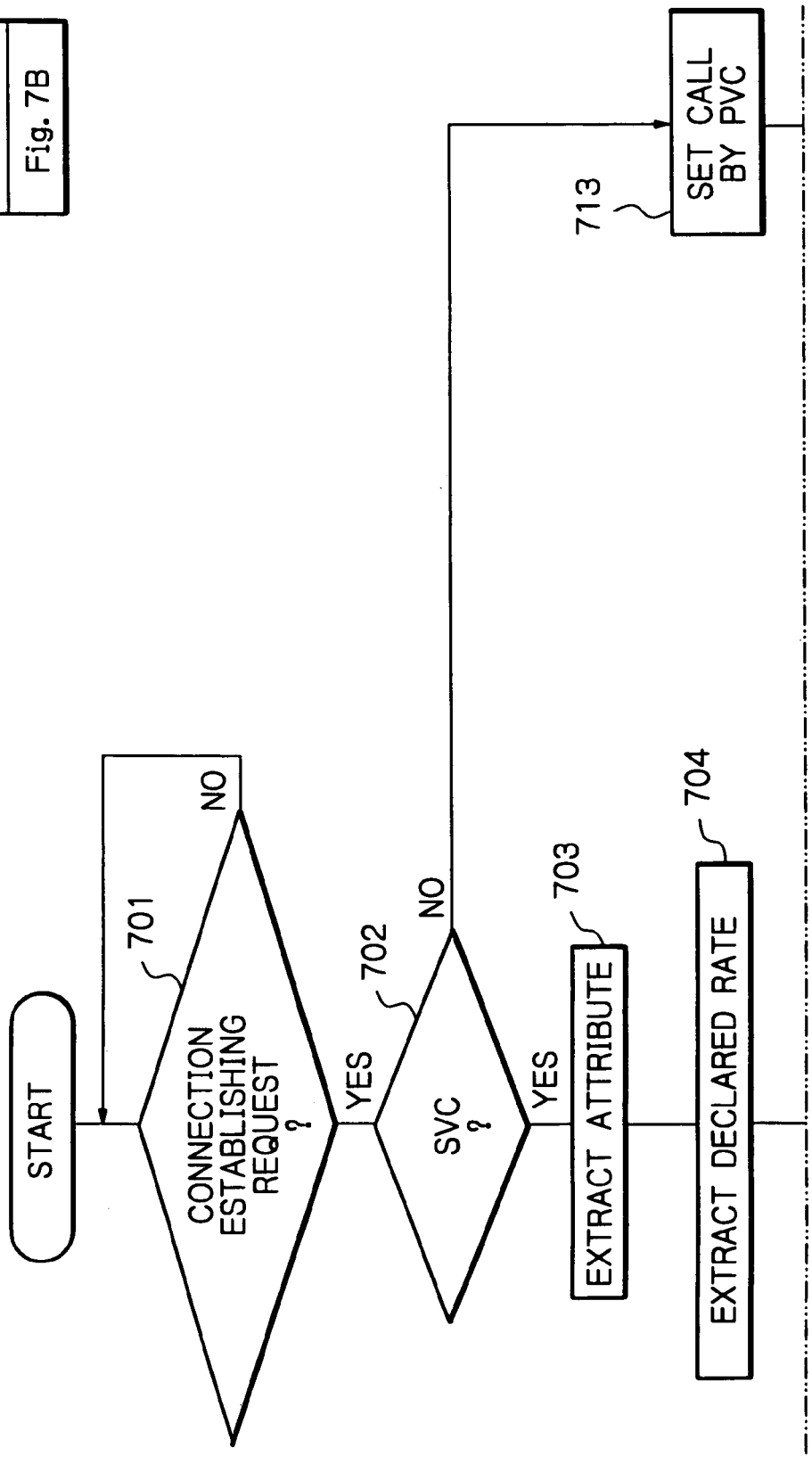

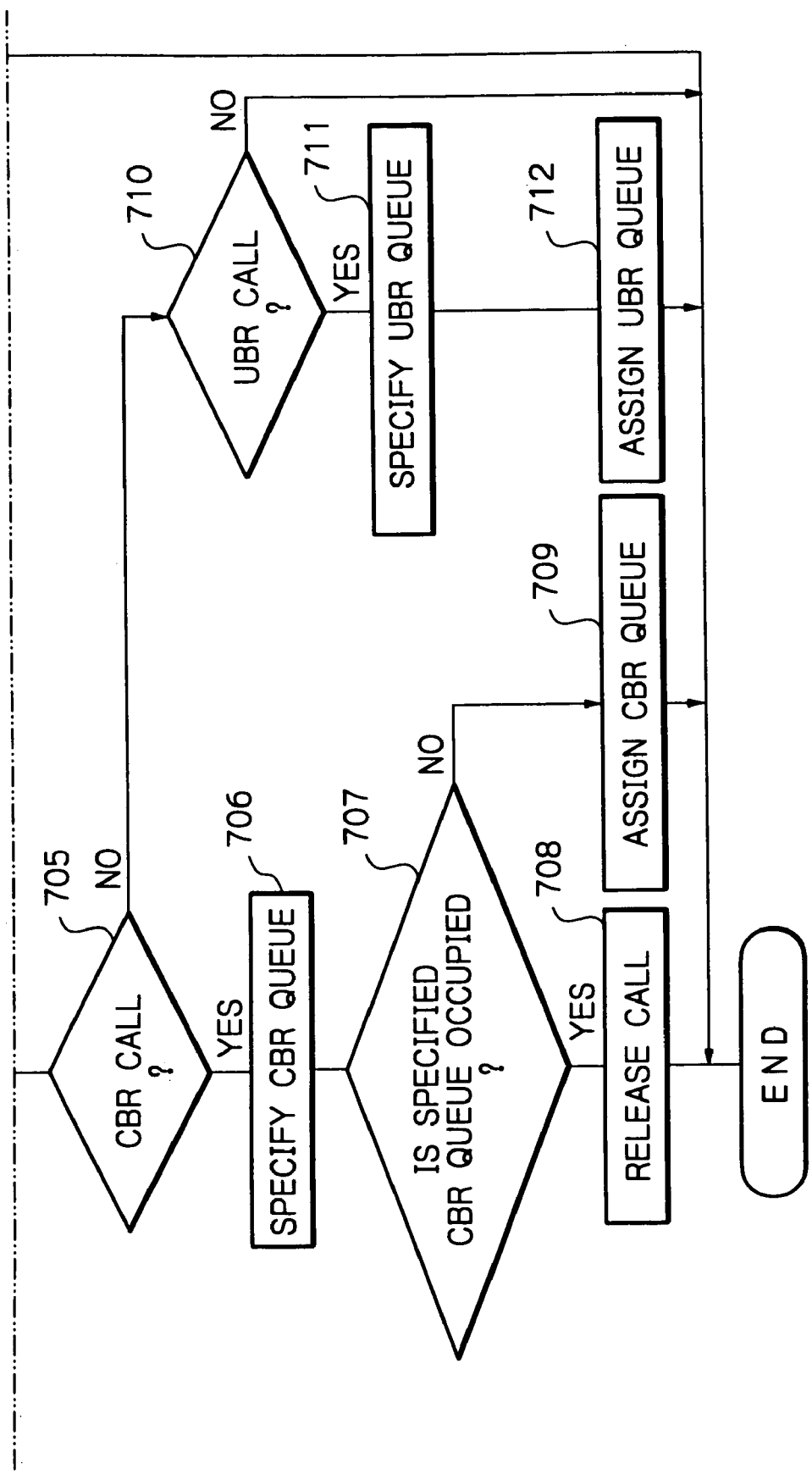

ASYNCHRONOUS TRANSFER MODE SWITCH WITH FUNCTION FOR ASSIGNING QUEUE HAVING FORWARDING RATE CLOSE TO DECLARED RATE

CROSS-REFERENCE TO RELATED PATENT APPLICATIONS

This application is a division of application Ser. No. 09/233,084, filed Jan. 19, 1999, now U.S. Pat. No. 6,731,603, and related to a concurrently filed application, entitled: Asynchronous Transfer Mode Switch with Function for Assigning Queue Having Forwarding Rate Close to Declared Rate, and based on Japanese Patent Application No. 10-020129, filed Jan. 19, 1998, by Ryota MOTOBAYASHI. This application claims only subject matter disclosed in the parent application and therefore presents no new matter.

BACKGROUND OF THE INVENTION

1. Field of the Invention

The present invention relates to an asynchronous transfer mode (ATM) switch for controlling traffic and, more particularly, it relates to an asynchronous transfer mode switch adapted to confine the transfer cell forwarding rate to a preselected forwarding rate.

2. Description of the Related Art

According to the ATM exchange technology, information from various different media including audio information and video information can be transmitted for telecommunications by using as units fixed length blocks that are referred to as cells. Such cells typically have a 53-octet length, of which a 5-octet length is used as a header section and the remaining 48-octet length is used as a user information section. Information to be used for identifying the destination of connection is included in the header section to realize a high speed switching by means of hardware. Additionally, since information can be transferred whenever it needs to be forwarded with the ATM, the existing rate can be utilized effectively and efficiently.

In a prior art ATM switch, an unspecified bit rate (UBR) type switched virtual connection (SVC) is used, so that a plurality of connections can be assigned to one queue of a shaping processing section, if the connections have the same declared rate. This will be explained later in detail.

Note that JP-A-8-125668 titled "ATM interface and Shaping Method" describes a technique, with which a "shaping" operation is performed by storing in advance the largest cell forwarding interval corresponding to each traffic condition that gives rise to an ATM cell portion discarded by the usage parameter control (UPC) for the virtual path identifier (VPI) and also for the virtual channel identifier (VCI) and, upon arrival of the ATM cell to be forwarded, forwarding it to an idle forwarding time slot according to the stored largest cell forwarding interval.

Also, JP-A-8-288951 titled "ATM Switch and Congestion Control Method for ATM-LAN" described a technique of selecting a backward explicit congestion notification (BECN) system for dealing with congestion by narrowing the transmission rate all the regions including the ATM local networks (LANs) containing respectively a transmission terminal and a reception terminal and also covering the transmission terminal and the reception terminal upon receiving a notification from a congested ATM switch depending on the site of congestion, a fast reservation protocol (FRP) system for dealing with congestion by forwarding a signal cell adapted to broaden the transmission rate for the downstream upon receiving a notification from the congested ATM switch and a forward explicit congestion notification (FECN) system for writing the identifier for "the occurrence of congestion" in the payload type (PT) of the cell header forwarded from the congested ATM switch and causing the reception terminal receiving the identifier to notify the transmission terminal so as to broaden the transmission rate, whichever is optimum, depending on the conditions of connection.

The prior art ATM switch, however, does not have a simplified configuration and is not adapted to assign optimum queues by using the UBR type SVC system. That is, if there are requests for connection requiring queues exceeding the number of queues constituting a cell buffer it has for shaping, it is impossible to effectively control the communication traffic.

SUMMARY OF THE INVENTION

It is an object of the present invention to provide an ATM switch having a simplified configuration and adapted to assign optimum queues, particularly by using the UBR type SVC system.

According to the present invention, in an asynchronous transfer mode switch a plurality of queues are provided for accumulating transfer cells, and a queue assignment processing section receives a message for establishing a connection and assigns to the connection one of the queues having a forwarding rate close to a declared rate included in the message and not exceeding the declared rate.

Thus, even if connections do not have the same declared rate, one queue can be assigned to the connections without remarkably deteriorating the communication quality.

BRIEF DESCRIPTION OF THE DRAWINGS

The present invention will be more clearly understood from the description as set forth below, as compared with the prior art, with reference to the accompanying drawings, wherein:

FIGS. 7A and 7B are flowcharts showing the operation of the connection assignment processing section of FIG. 5;

DESCRIPTION OF THE PREFERRED EMBODIMENT

Before the description of the preferred embodiment, a prior art shaping method will be explained with reference to FIGS. 1, 2, 3 and 4.

Figure 1:
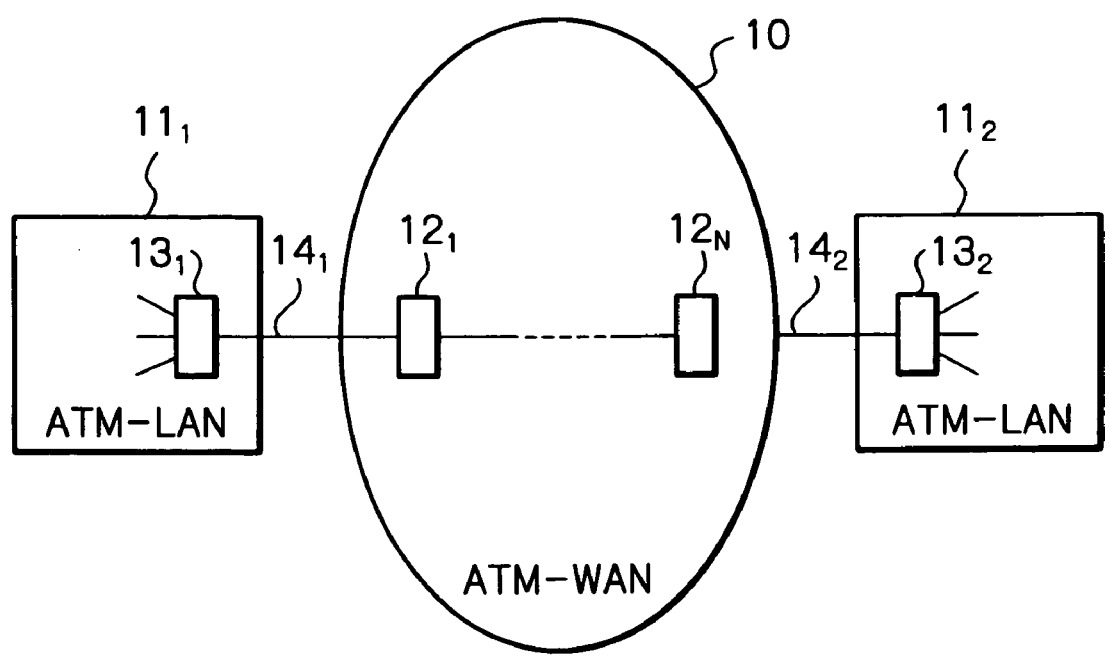
FIG. 1 is a diagram illustrating a prior art ATM network.

In FIG. 1, which illustrates a prior art ATM network utilizing the ATM technology, this ATM network is adapted to transmit sophisticated information including moving pictures for the user and provide the user with services in a way more responsive to the user's needs than compared with conventional networks. This ATM network is constructed by a plurality of ATM local area networks (LANs), such as $11_1$ and $11_2$ which are private networks including private branch exchanges, and an ATM wide area network (WAN) 10 for connecting the ATM-LANs $11_1$ and $11_2$, the ATM-WAN 10 being a public network.

The ATM-WAN 10 has a plurality of ATM switches $12_1, \ldots, 12_N$ in it. The ATM switch $12_1$ is connected to an ATM switch $13_1$ in the ATM-LAN $11_1$ by way of a communication line $14_1$. The ATM switch $12_N$ is connected to an ATM switch $13_2$ in the ATM-LAN $11_2$ by way of a communication line $14_2$. The lines from the ATM-LAM $11_1$, ATM-WAN $11_2$ and so on are mutually connected in the ATM-WAN 10 to form a communication connection. Each of the ATM-LAN $11_1$ and the ATM-LAN $11_2$ has a plurality of users (not shown) connected to it, and the users can communicate with one another within the LAN. Such a LAN is normally used as a network covering a limited area, which may typically be a school or a commercial company, and controlled within the network area to which it belongs.

The administrator of the ATM-WAN 10 concludes contracts with subscribers who operate the ATM-LAN $11_1$ and the ATM-LAN $11_2$ for the network services it provides with rate to be used for the services in the form of "bits per second" or "cells per second" in advance. The rates that are made available for the subscribers under the contracts are used as the basis for calculating the telecommunications charges for the network services provided by the ATM-WAN 10 and also for determining the amount of capital investment that may be required for the additional rates of communication lines to be provided within the ATM-WAN 10. Note that the expression "bits per second" referring to the number of bits to be transmitted per second and the expression "cells per second" referring to the number of cells to be transmitted per second are synonymously used. For example, for ATM telecommunications conforming to the recommendation I.361 of International Telecommunication Union-Telecommunication Standardization Sector (ITU-T), a cell is defined to have a 53-octet length and hence "cells per second'='bits per second'(53×8)."

Then, under such contracts, any of the users of the ATM-LAN $11_1$ and the ATM-LAN $11_2$ can access any of the resources of the networks by way of the ATM-WAN 10. Since each of the ATM-LAN $11_1$ and the ATM-LAN $11_2$ has a configuration optimally adapted to the environment of the network and is not profit-oriented, each of the users normally does not have to pay attention to the cost of telecommunications within the network to which he or she belongs. On the other hand, the ATM-WAN 10 is a public network and communication data can flow into it from other LANs (not shown). For example, if one of the users of the ATM-LAN $11_1$ caused traffic exceeding the operating rate for which the user had contracted to flow into the ATM-WAY 10, he or she may use one or more additional communication rates allocated to the remaining users. Then, the administrator of the ATM-WAN 10 may become unable to provide the subscribers with services to which the subscribers are entitled under the contracts. Therefore, the ATM switches that are used in LANs and WANs are normally so arranged as to control the communication traffic in such a way that the users may be provided with optimal services and such a situation may appropriately be avoided.

Figure 2:
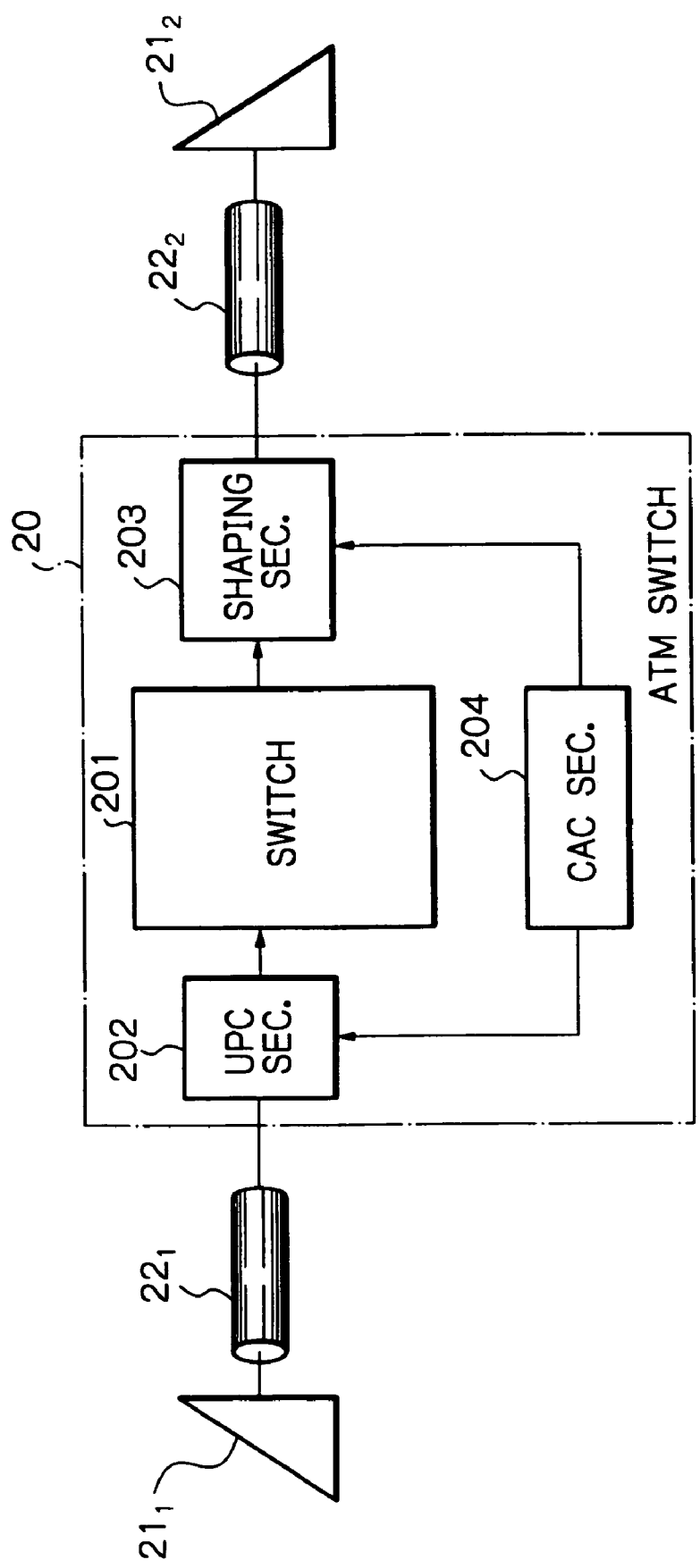
FIG. 2 is a block circuit diagram illustrating one of the ATM switches of FIG. 1.

FIG. 2 is a block circuit diagram of one of the ATM switches of FIG. 1 for controlling a communication traffic, showing only principal components thereof. In order to facilitate the understanding of the principle of the operation of controlling a communication traffic, it is assumed here that an ATM switch 20 is connected between a transmission terminal $21_1$ and a reception terminal $21_2$, so that ATM transfer cells are transferred from the transmission terminal $21_1$ to the reception terminal $21_2$. Thus, the ATM switch 20 exchange communication data with the transmission terminal $21_1$ and the reception terminal $21_2$ by way of lines $22_1$ and $22_2$, respectively.

The ATM switch 20 is constructed by a switch 201 for connecting an input line and an output line assigned to a preselected connection, a usage parameter control (UPC) section 202 arranged upstream toward the input side relative to the switch 201 for identifying the virtual path identifier (VPI) and the virtual channel identifier (VCI) of an ATM transfer cell flowing in from the transmission terminal $21_1$ by way of the line $22_1$ and monitoring if the cell is transferred with a predetermined rate, and a shaping section 203 arranged downstream toward the output side relative to the switch 201 for controlling the forwarding rate of the transfer cell by controlling the priority of the transfer cells and buffering the transfer cells so that the rate of the line $22_2$ for the output to the reception terminal $21_2$ may not be exceeded. The UPC section 202 and the shaping section 203 are controlled by a connection admission control (CAC) section 204 in accordance with the destination of the connection that is notified when the selected connection is established prior to the cell transfer, the declared value for the cell forwarding rate, and the priority.

The UPC section 212 monitors the traffic from the transmission terminal $21_1$ in accordance with the rate declared when the selected connection is established so that it may not flow in excessively. In other words, so long as the traffic from the communication terminal $21_1$ does not exceed the declared rate, it is transferred to the switch 201 without obstruction. However, once the traffic exceeds the declared rate, the excessive cells are processed by means of an optimal method selected from the following processing methods as a function of the specific field of ATM telecommunications of the traffic. The processing methods include (1) a method of simply discarding the excessive portion of the traffic, (2) a method of marking the excessive portion of the traffic and selectively discarding the marked excessive portion when the network is congested or billing an extra communication charge for that portion, and (3) a method of delaying the excessive portion of the traffic until an idle time slot of the network is found. However, the marking method (2) or the delaying method (3) requires the use of an additional circuit and involves a complex processing operation which consequently raises the cost of telecommunication. Particularly, the delaying method (3) is accompanied by the problem of delay time and hence is applicable only to a limited field of ATM telecommunications. On the other hand, the discarding method (1) can simplify the configuration of the network most.

The shaping section 203 controls the forwarding rate by accumulating the cells to be forwarded in the buffering assigned to each connection, so that the predetermined forwarding rate may not be exceeded and a situation where the portion exceeding the declared rate is discarded by the UPC section 202 at the next stage ATM switch may be avoided.

When the ATM switch as illustrated in FIG. 2 is applied to the ATM network as illustrated in FIG. 1, an ATM switch that functions substantially the same as the shaping section 203 is used for both the ATM switch $13_1$ of the ATM-LAN $11_1$ and the ATM switch $13_2$ of the ATM-LAN $11_2$ while an ATM switch that functions substantially the same as the UPC section 202 is used for both the ATM switch $12_1$ and the ATM switch $12_2$ of the ATM-WAN 10. Since the ATM-WAN 10 has a function corresponding to that of the UPC section 202 in it, a situation where the portion exceeding the declared rate is discarded in the ATM-WAN 10 can be effectively avoided by shaping and limiting the rate forwarded from the ATM-LANs $11_1$ and $11_2$.

Figure 3:
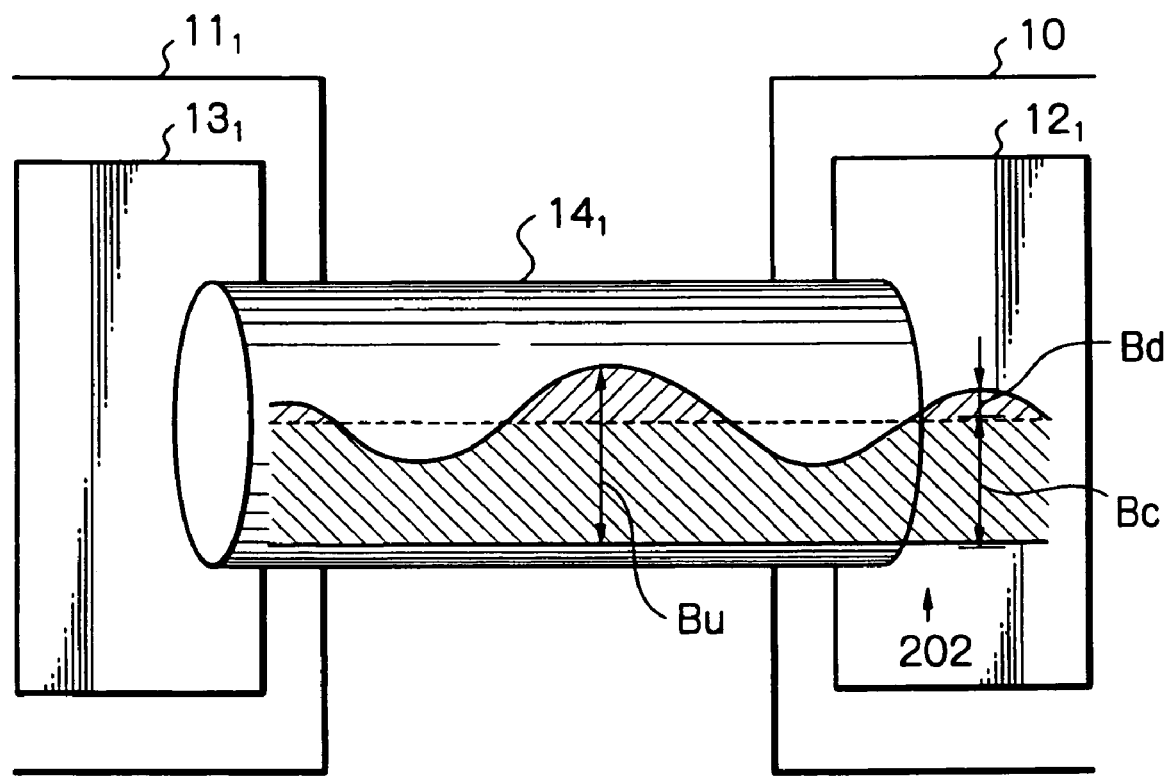
FIG. 3 is a diagram for explaining the operation of the UPC section of FIG. 2.

FIG. 3 is a diagram for explaining the operation of the UPC section 202 of FIG. 2 for controlling the traffic from the ATM-LAN $11_1$ to the ATM-LAN $11_2$ in accordance with the declared rate. It will be seen that traffic Bu that changes with time relative to the contract value Bc predetermined by the administrator of the ATM-LAN $11_1$ is made to flow into the ATM-WAN 10. If the rate Bu exceeds the contract rate Bc and is made to flow into the ATM-WAN 10 on purpose, by mistake or for some other reason, the administrator of the ATM-WAN 10 may discard the excessive portion Bd (=Bu-Bc) of the traffic exceeding the contract value Bc according to any of the above described methods. The operation of monitoring whether every subscriber of the ATM-LAN $11_1$ is properly observing the contract rate Bc or not by means of the UPC section 202 of the ATM switch $12_1$ of the ATM-WAN 10 is referred to simply as "UPC" or "policing." With this operation, the traffic can be controlled within the ATM-WAN 10 in accordance with the contract rate, so that other subscribers may not be adversely affected.

Figure 4:
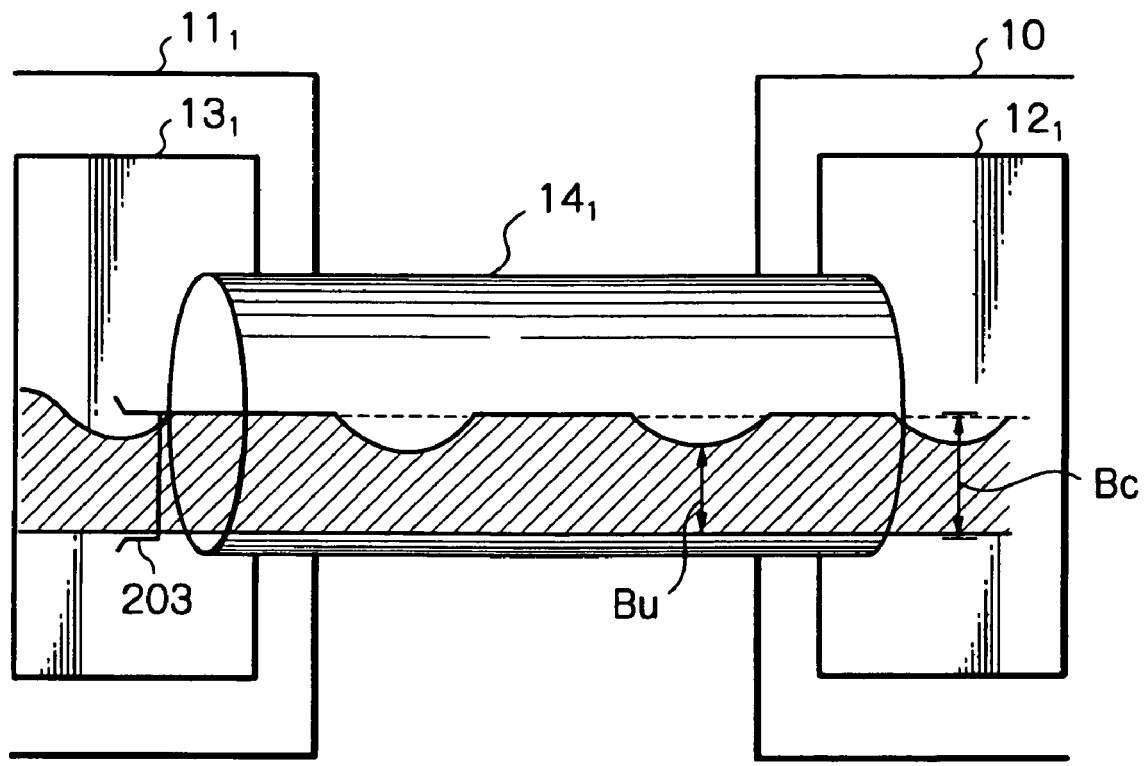
FIG. 4 is a diagram for explaining the operation of the shaping section of FIG. 2.

FIG. 4 is a diagram for explaining the operation the shaping section 203 for controlling the traffic from the ATM-LAN $11_1$ to the ATM-WAN 10. The administrator of the ATM-LAN $11_1$ limits the rate Bu being forwarded that changes with time by means of the shaping section 203 so that it may remain within the contract rate Bc. The forwarding control operation of the shaping section 203 is referred to as "traffic shaping" or simply as "shaping." With this arrangement, the rate forwarded from the ATM-LAN $11_1$ can reliably be limited by the "shaping" so as not to exceed the rate under the control of the "UPC" of the ATM-WAN 10, and hence the traffic rate flowing into the ATM-WAN 10 may not exceed the contract rate Bc. Thus, no portion of the traffic forwarded from the ATM-LAN $11_1$ will be discarded for the reason of violating the contract if it exceeds the contract value Bc.

The shaping section 203 is constructed by a cell buffer formed by a first-in first-out memory and adapted to temporarily accumulate the cells flowing toward the ATM-WAN 10 from the ATM-LAN $11_1$ and forward them to the ATM-WAN 10 with a rate not exceeding the contract rate Bc.

In each of the ATM-LANs $11_1$ and $11_2$, the connection from the related terminal is then connected to the ATM-WAN 10 by way of ATM switches arranged in a plurality of stages. Thus, the cell transfer intervals can "fluctuate" or change irregularly to show "sparseness" and "denseness," which by turn can give rise to fluctuations in the cell transfer delay within the ATM-LAN or the cell transfer delay due to some other reasons on the part of the traffic. If, for example, the transfer intervals of the cells belonging to the same connection become "dense" in the telecommunication traffic, the forwarded rate of the connection can exceed the contract rate Bc before it flows into the ATM-WAN 10. Therefore, the cell buffer is used to absorb the "fluctuations" so that the forwarded rate may constantly remain below the contract rate Bc.

The cell buffer (shaper) is generally constructed by establishing a plurality of juxtaposed queues in a memory device and a rate is selected for each of the queues to determine the rate of reading data therefrom. A connection requesting to be connected can be "shaped" by selecting one of the queues of a rate that seems optimal for the connection out of the queues and assigning it to the connection.

In a permanent virtual connection (PVC) system, each of the administrator of the ATM-LANs $11_1$ and $11_2$ and the ATM-WAN 10 selects a rate for each queue in advance to establish the connection by taking the users of each of the networks and the state of utilization of the network into consideration and the connection itself is selected at the same time. With this system, a queue that seems to be optimal can be selected as a very close queue with a rate not exceeding the contract rate Bc is selected for the connection selected by the administrator. However, the PVC system is accompanied by a problem of increasing the number of rates and carrying out a cumbersome reselecting operation that occurs each time a new user enters the scene.

On the other hand, in view of the circumstances where information transfer operations are required to be carried out with every possible rate to adapt themselves to an ever increasing diversity of information to be transferred, there is a strong demand for a connection method using a switched virtual connection (SVC) system for establishing a connection with any given partner at any time at any selected rate so that services may be provided in a more flexible fashion.

Also, the SVC system is divided into a constant bit rate (CBR) system and an unspecified bit rate (UBR) system.

In the CBR system, a connection occupies the queues constituting a cell buffer to determine the partner each time a communication is started, so that another connection cannot be assigned in a multiplexed fashion.

In the UBR system, if two or more connections have the identical rate, the two or more connections are assigned to one of the queues.

In the UBR system, however, if the rate of one connection is a little deviated from the rate of another connection, it is possible to assign the same queue to them. Thus, since the number of queues constituting a cell buffer is inevitably limited (e.g. to eight queues) depending on the conditions of the ATM switch including the surface area for mounting the electronic circuit components and other hardware components if there arises a connection requiring queues exceeding this number, there is no way to assign queues to the connection so that the conventional congestion control can remain baseless. For example, an ordinary ATM switch cannot deal with thousands of connections simultaneously; however, the number of connections is actually limited to eight, for example, in view of the number of queues.

Additionally, while the rate of the connection to be established is selected according to the peak rate or a rate close to that peak rate, the cell intervals getting to the queue are rather irregular and variable depending on the conditions of the network and hence do not always show the peak rate. As a result, the resources including the queues may not necessarily be effectively and efficiently utilized to fully exploit the forwarding potential of the rates of the network.

Figure 5:
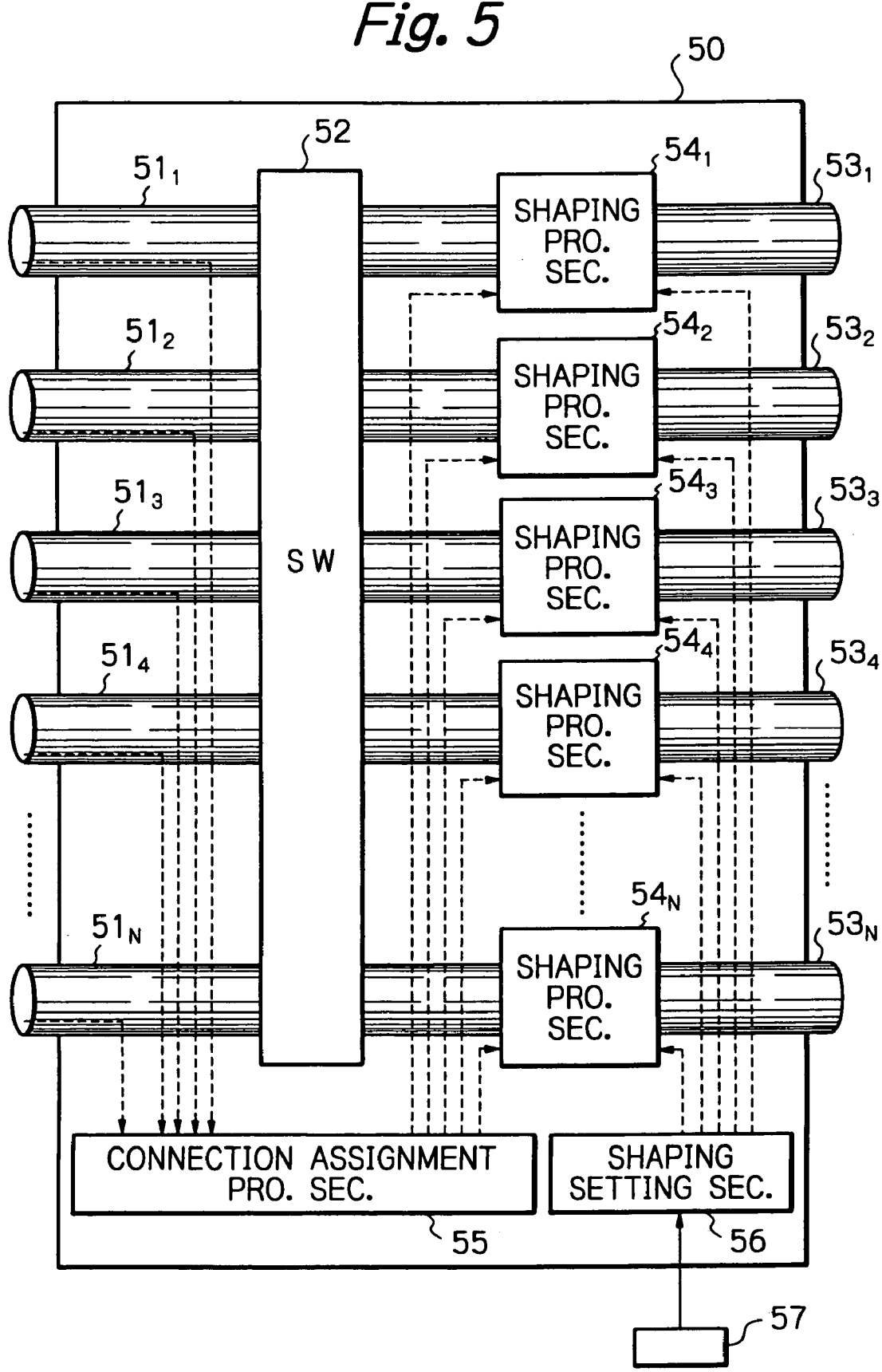
FIG. 5 is a block circuit diagram illustrating an embodiment of the ATM switch according to the present invention.

In FIG. 5, which illustrates an embodiment of the ATM switch according to the present invention, only the principal elements thereof relating to a "shaping" operation are illustrated. An ATM switch 50 is constructed by a plurality of input line $51_1, 51_2, 51_3, 51_4, \ldots, 51_N$, a switch section 52, and a plurality of output lines $53_1, 53_2, 53_3, 53_4, \ldots 53_N$. The switch section 52 connects the input lines $51_1, 51_2, 51_3, 51_4, \ldots 51_N$ to the output lines $53_1, 53_2, 53_3, 53_4, \ldots 53_N$ in accordance with the VPI and the VCI written in the header section of an ATM cell. Shaping processing sections $54_1, 54_2, 54_3, 54_4, \ldots 54_N$ are provided in the output lines $53_1, 53_2, 53_3, 53_4, \ldots 53_N$, each having a plurality of queues. A transfer data is forwarded from the ATM switch 50 by way of one of the shaping processing sections $54_1, 54_2, 54_3, 54_4, \ldots 54_N$.

Also, a connection assignment processing section 55, when a connection establishing request is received with a call from the transmission terminal of an ATM-LAN (not shown), it assigns one or more queues of the corresponding one of the shaping processing sections $54_1$ through $54_N$ by referring to the declared rate contained in a call selection message for establishing the connection.

Further, the ATM switch 50 includes a shaping setting section 56 for setting a forwarding rate for each of the shaping processing sections $54_1$ through $54_N$ by way of a service provider interface 57 of a service provider interface system (not shown) and defining the attribute of each cell to be accumulated.

Now, the configuration of the shaping processing sections $54_1$ through $54_N$ will be explained to illustrate the forwarding rate and the cell attribute set by the shaping setting section 56.

Figure 6:
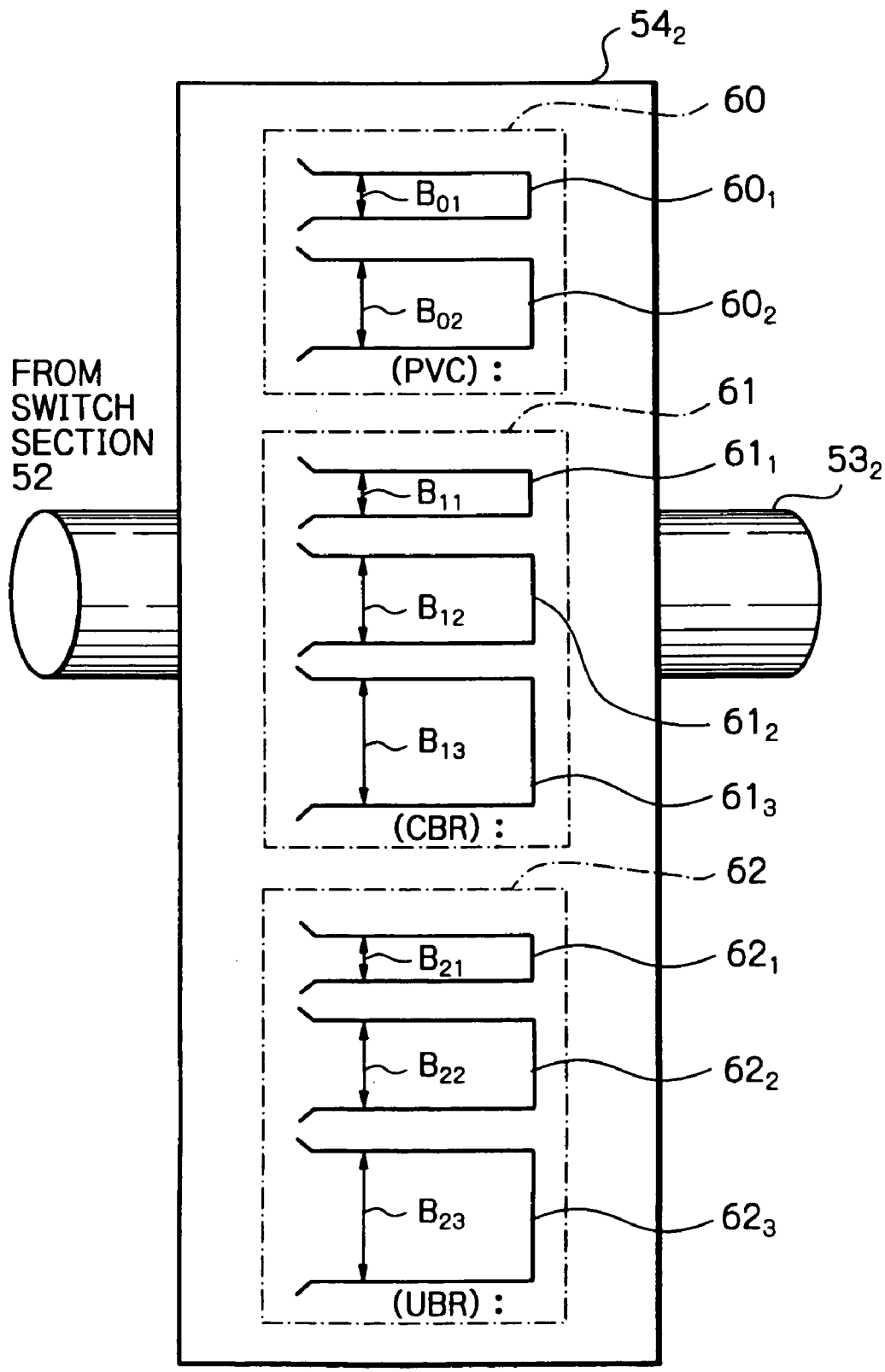
FIG. 6 is a detailed block circuit diagram of the shaping processing section of FIG. 5.

In FIG. 6, which illustrates the shaping processing section such as $54_2$ of FIG. 5, the shaping processing section $54_2$ is constructed by a queue section 60 for a PVC system, a queue section 61 for a CBR system of an SVC system, and a queue section 62 for a UBR system of the SVC system.

The attributes such as PVC, CBR and UBR of each connection are set by the shaping setting section 56.

The queue section 60 is constructed by a PVC queue $60_1$ having a forwarding rate $B_{01}$, and a PVC queue $60_2$ having a forwarding rate $B_{02}, \ldots$ Here, $B_{01} < B_{02} < \ldots$ The queue section 61 is constructed by a CBR queue $61_1$ having a forwarding rate $B_{11}$, and a CBR queue $61_2$ having a forwarding rate $B_{12}, \ldots$ Here, $B_{11} < B_{12} < \ldots$ The queue section 62 is constructed by a UBR queue $62_1$ having a forwarding rate $B_{21}$, and a UBR queue $62_2$ having a forwarding rate $B_{22}, \ldots$ Here, $B_{21} < B_{22} < \ldots$ As described above, a PVC system and the SVC system may be used for an ATM telecommunication system. Since the administrator carries out a connection with the PVC system, he or she can also set one of the queues to be used for the connection so that an optimum queue may be assigned to the connection with the related rate. On the other hand, with the SVC system, since the rate of the line to be used for a connection is secured in accordance with the declared rate provided with a call from a terminal, it is difficult for the administrator to recognize the type of traffic in advance and set an optimum queue unlike the case of the PVC system. Thus, different attributes may be used for the CBR and UBR system as described above to effectively utilize the rates.

In the case of the CBR system, traffic always occurs with a peak cell rate (PCR). Thus, if there is a CBR connection with a PCR of 10 megabits/sec, there always occurs traffic with a PCR of 10 megabits/sec. Assume then a queue having a forwarding rate of 10 megabits/sec is assigned to the CBR connection. If the queue is assigned to another CBR connection with a PCR of 10 megabits/sec, cells will have to be discarded as excessive traffic with an average of 5 megabits/sec for each of the two connections. Thus, it is highly desirable that a queue to be exclusively used for the CBR system is assigned to a CBR connection in order to avoid a situation where the same queue is duplicately assigned to two connections.

On the other hand, in the case of the UBR system, the same queue may be assigned to a plurality of connections in a multiplexed fashion because traffic does not necessarily occur at PCR unlike the case of the CBR system. Thus, the same queue having a forwarding rate of 10 megabits/sec, for example, may be assigned to a plurality of connections of UBR calls with a PCR of 10 megabits/sec in a multiplexed manner.

As described above, queues are used discriminately for the CBR system that does not allow any multiplexed assignment and for the UBR system that allows multiplexed assignment to take the characteristic features of the CBR and UBR systems into consideration, so that an optimum queue may be assigned without difficulty to any connection that occurs with a call of the SVC system. Since the administrator recognizes the type of connection to be established in the case of the PVC system, he or she can determine whether or not a single queue can be assigned to a plurality of connections and, therefore, it is not necessary to discriminate the CBR and UBR systems.

The operation of the connection assignment processing section 55 will be explained next with reference to FIG. 7. The connection assignment processing section 55 is designed to assign an optimum queue having a predetermined rate and adapted to the attribute of a connection out of the shaping processing sections $54_1$ through $54_N$ in accordance with the declared rate contained in a call selection message for establishing the connection. Note that the connection assignment processing section 55 is constructed by a central processing unit (CPU), a read only memory (ROM), and a random access memory (RAM), so that the CPU may assign an optimum queue to the connection in accordance with the connection assignment procedure stored in the ROM.

First, at step 701, it is determined whether or not a connection establishing request from a transmission terminal is a call selection message. Only when such a connection establishing request is received, does the control proceed to step 702. Otherwise, the control returns to step 701 which continues to wait for the reception of a connection establishing request.

At step 702, it is determined whether the connection to be established is of the SVC system, or of the PVC system on the basis of the received call selection message. If it is determined that the connection is of the SVC system, the control proceeds to step 703. On the other hand, if it is determined that the connection is of the PVC system, the control proceeds to step 713.

At step 703, the attribute of the connection to be established is extracted from the call selection message. The attribute of the connection represents whether the connection is of the CBR system or the UBR system on the basis of the call selection message. Then, at step 704, the declared rate contained in the same call selection message is extracted.

Next, at step 705, it is determined whether the connection of the call is a CBR call. As a result, if the attribute of the connection is a CBR call, the control proceeds to step 706 which selects an output line for the connection in accordance with the VPI and the VCI of the connection and, at the same time, specifies an optimum CBR queue such as $61_1, 61_2, \ldots$ out of the queue section 61 assigned in advance by the administrator from the shaping processing section corresponding to the output line.

For specifying the optimum CBR queue at step 706, the assigned queue with the very close rate not exceeding the declared rate extracted at step 704 is selected. If the forwarding rate $B_{12} \leq$ declared rate<the forwarding rate $B_{13}$, the CBR queue $61_2$ is specified as the optimum CBR queue that can be specified with ease by making the queues with the same connection attribute CBR having different forwarding rates. For extreme simplification, it may be so arranged that a call is not received when there is no CBR queue to be forwarded with a very close forwarding rate not exceeding the declared rate.

Next, at step 707, it is determined whether or not the specified CBR queue is occupied. As a result, when the specified CBR queue is occupied, the control proceeds to step 708 which does not receive the call but releases the call. On the other hand, when the specified CBR queue is not occupied, the control proceeds to step 709 which assigns the specified CBR queue to the connection to be established as requested by the call.

On the other hand, at step 705, if the attribute of the connection is not a CBR call, the control proceeds to step 710 which determines whether or not the connection is a UBR call. As a result, only when the connection is a UBR call, does the control proceed to step 711 which selects an output line for the connection in accordance with the VPI and the VCI of the connection and, at the same time, specifies an optimum UBR queue out of the queue section 62 assigned in advance by the administrator from the shaping processing section corresponding to the output line in a manner as described above for specifying an optimum CBR queue at step 705.

For specifying the optimum queue UBR at step 711, the assigned queue with the very close rate not exceeding the declared rate extracted at step 704 is selected. If the forwarding rate $B_{22} \leq$ declared rate<the forwarding rate $B_{23}$, the UBR queue $62_2$ is specified as the optimum UBR queue for the connection.

Next, at step 712, the specified UBR queue is assigned to the connection. Since the attribute refers to a UBR call, the same UBR queue can be assigned to a plurality of connections.

On the other hand, at step 702, if it is determined that the connection to be established is not of the SVC system on the basis of the call selection message, the control proceeds to step 713 which sets the PVC system for the call.

Figure 8:
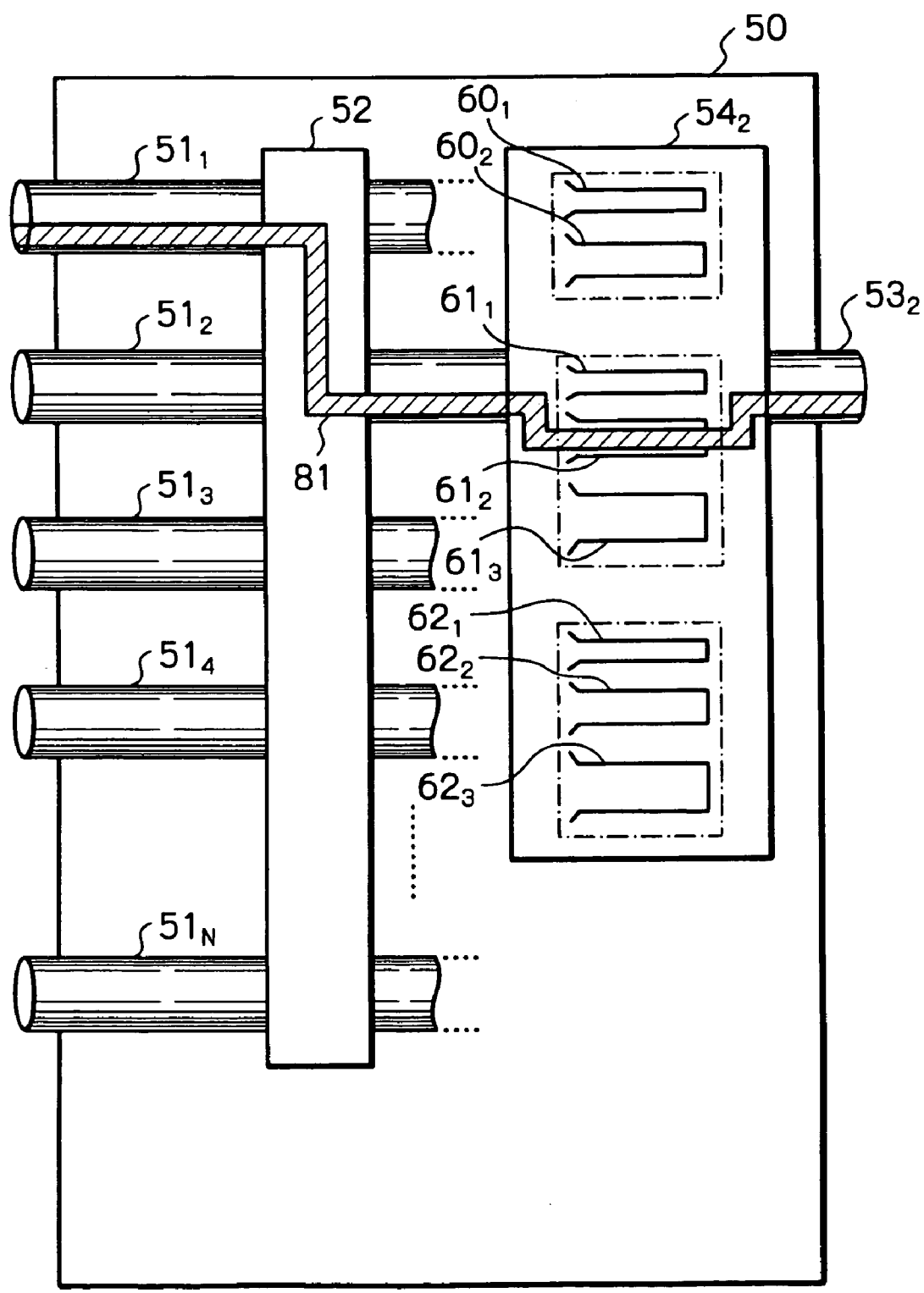
FIG. 8 is a diagram for explaining the assignment of an optimum CBR queue in the shaping processing section of FIG. 6.

Assuming that the rates as illustrated in FIG. 6 are selected for the queues of the shaping processing sections $54_1$ through $54_n$ inserted between the switch section 52 and administrator as described above, the operation to be carried out when a CBR call having a relationship of the forwarding rate $B_{12} \leq$ "declared rate of the connection"<the forwarding rate $B_{13}$ is made will be explained next with reference to FIG. 8.

Upon receiving a CBR call, the CPU of the connection assignment processing section 55 determines whether or not the call requesting for connection is of the SVC system in accordance with the call selection message of the CBR call. The CPU additionally extracts the declared rate contained in the call selection message of the SVC system because the call is a CBR call. Then, the CPU further determines whether the call is a CBR call or a UBR call. After determining that the call is a CBR call and seeing that the declared rate is defined by the formula of the forwarding rate $B_{13} \leq$ "declared rate of the connection"<the forwarding rate $B_{13}$, the CBR queue $61_2$ having the forwarding rate value $B_{12}$ is selected out of the CBR queue section 61 having a very close rate not exceeding the declared rate. Since no queue is allowed to be duplicatively assigned for a CBR call as described above, the CPU determines whether or not the queue has been assigned to some other connection and, if it is found that the queue has not been assigned to any other connection, it assigns the selected CBR queue as indicated by 81 in FIG. 8. If, on the other hand, it is found that the CBR queue is occupied, the call is not received and subjected to a predetermined call releasing process before it is released.

Now, assuming that the rates as illustrated in FIG. 6 are selected for the queues of the shaping processing sections $54_1$ through $54_N$ inserted between the switch section 52 and the respective output lines $53_1$ through $53_n$ by the administrator as described above, the operation to be carried out when a UBR call having a relationship of the forwarding rate $B_{22} \leq$ "declared rate of the connection"<the forwarding rate $B_{23}$ is made will be explained next with reference to FIG. 9.

Figure 9:
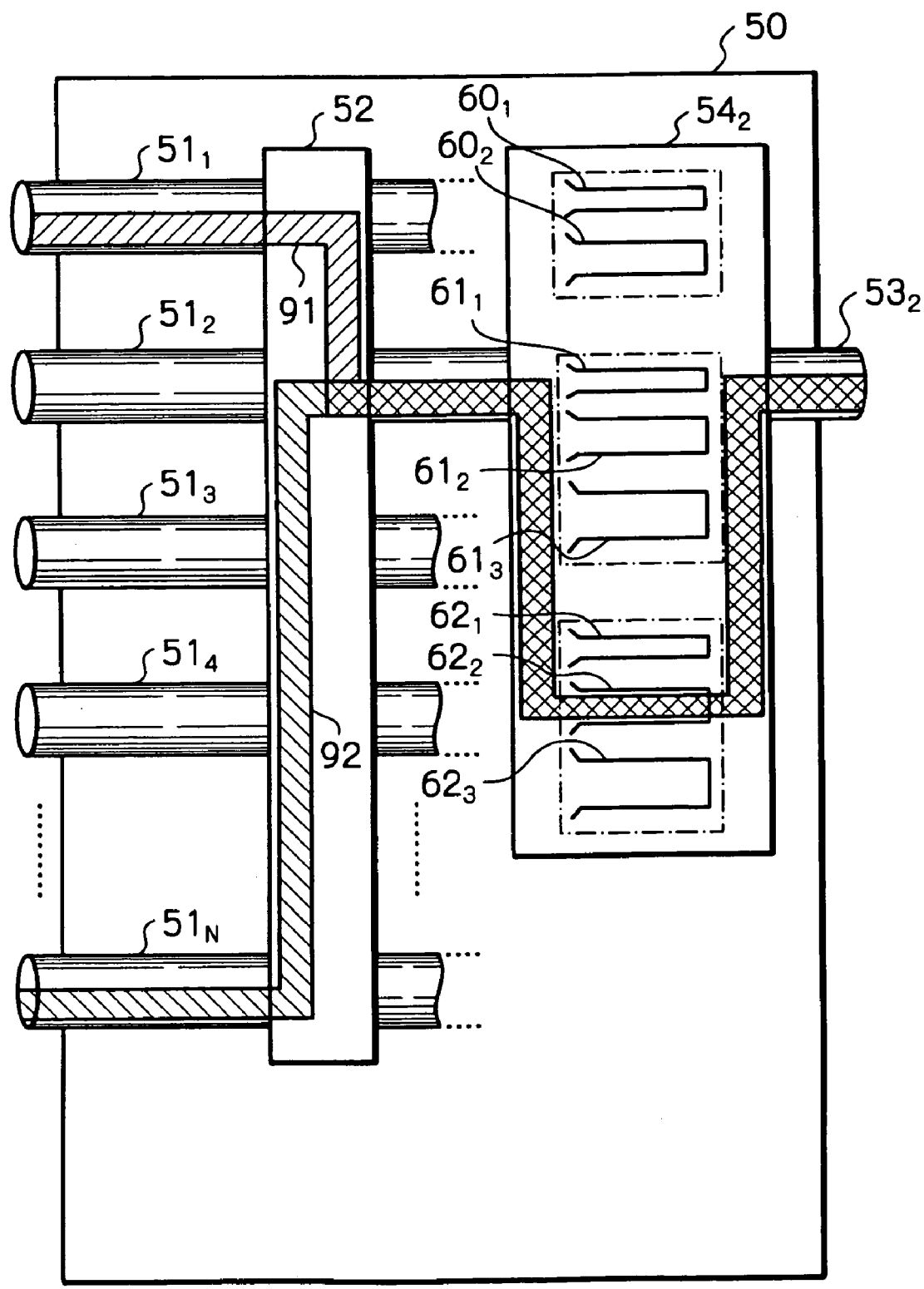
FIG. 9 is a diagram for explaining the assignment of an optimum UBR queue in the shaping processing section of FIG. 6.

Assume here that the traffic from the input line $51_1$ is of the UBR system and the UBR queue $62_2$ of the shaping processing section $54_2$ corresponding to the output line $53_2$ is assigned to it as indicated by 91 in FIG. 9, when a new connection establishing request is made to the output line $53_2$ from the input line $51_N$.

Firstly, upon receiving a UBR call, the CPU of the connection assignment processing section 55 determines whether or not the call requesting connection is of the SVC system in accordance with the call selection message of the UBR call. The CPU additionally extracts the declared rate contained in the call selection message of the UBR call. The CPU additionally extracts the declared rate contained in the call selection message of the SVC system because the call is a UBR call. Then, the CPU further determines whether the call is a CBR call or a UBR call. After determining that the call is a UBR call and seeing that the declared rate is defined by the formula of the forwarding rate $B_{22} \leq$ "declared rate of the connection"<the forwarding rate $B_{23}$, the UBR queue $62_2$ having the forwarding rate $B_{22}$ is selected out of the queue section 61 having a very close rate not exceeding the declared rate. Since a UBR queue can be duplicatively assigned for an UBR call as described above, the CPU can assign the selected queue without any further operation as indicated by 92 in FIG. 9.

In the case of an ATM switch having a "shaping" function as described above, the relationship of 'the rate forwarded from the ATM-LAN' $\leq$ 'the rate of the UPC of the ATM-WAN'" always holds true so long as the downstream ATM switch having a "UPC" function can recognize the declared rate so that the "UPC" function of the ATM-WAN eliminates cells exceeding the rate to avoid a situation where cells are discarded for nothing.

In the above-described embodiment, while the connection assignment processing section 55 does not accept a CBR call and simply releases it in the operation of assigning a CBR queue to the CBR call if the CBR queue has been assigned to some other connection, another CBR queue may alternatively be selected if this CBR queue has a narrower rate. For example, in the case of FIG. 9, the CBR queue $61_1$ having the forwarding rate value $B_{11}$ may be selected.

Additionally, while the above described embodiment is adapted to select a queue with a very close forwarding rate not exceeding the declared rate, the essential requirement to be met for the present invention is the selection of a queue with a rate not exceeding the declared rate, which is not necessarily a very close rate, although the selection of a queue with a rate that falls too short of the declared rate can remarkably degrade the quality of telecommunications of the telecommunication rate requested by the transmission terminal.

Still additionally, while the arrangement of assigning a single queue to a plurality of connections of this embodiment is subjected to a restriction that the total sum of the rates of these connections should not exceed the rate selected for the queue, it can operate very effectively particularly when the number of connection requests (e.g., several thousands) exceeds by far the limited number of available queues (e.g., several queues) and to avoid "UPC" that can be caused by the downstream ATM switch is the top priority.

Still additionally, although the ATM switch is used as a gate way connecting ATM-LANs and an ATM-WAN, it may alternatively be used as a general purpose telecommunication traffic control apparatus arranged upstream relative to an ATM switch having the "UPC" function and operated by means of the "shaping" function of the upstream ATM switch and the "UPC" function of the downstream ATM switch.

Finally, while the attribute of the traffic is described in terms of CBR and UBR for the embodiment, shaping assignment can be used for some other traffic defined in terms of variable bit rate (VBR) or available bit rate (ABR) typically by referring to the traffic parameters other than the PCR contained in the call selection message.

As explained hereinabove, according to the present invention, an asynchronous transfer mode switch can be simplified and adapted to assign optimum queues by using the SVC system, particularly, the UBR system thereof, and also to control the communication traffic in response to the request of a connection requiring queues exceeding the number of queues constituting a cell buffer it has for shaping.

What is claimed is:

1. An asynchronous transfer mode switch comprising:
   a connection establishing section for establishing a connection according to a predetermined transfer establishing request prior to a transfer of cells;
   a rate extracting section for extracting a transfer rate contained in said predetermined transfer establishing request as a declared rate;
   a transfer attribute extracting section for extracting an attribute indicating a type of transfer contained in said predetermined transfer establishing request;
   a plurality of queues for accumulating said cells;
   a data forwarding section having forwarding rates corresponding to said queues and being different from each other, said data forwarding section forwarding said cells so as for forwarding rates of said cells being forwarded from said queues not to exceed the forwarding rates of corresponding ones of said queues;
   a queue assigning section for assigning one of said queues having a very close forwarding rate not exceeding said declared rate in accordance with said attribute; and
   a switch section for transferring said flown-in cells to said one of said queues assigned by said queue assigning section.

2. The switch as set forth in claim 1, wherein said queue assigning section can assign said connection to said queues.

3. The switch as set forth in claim 1, wherein said queue assigning section assigns a minimum queue having the smallest rate when said declared rate does not exceed the smallest rate of said minimum queue.

4. The switch as set forth in claim 1, further comprising a notifying section for externally notifying said declared rate.

5. The switch as set forth in claim 1, wherein said attribute is used to indicate a permanent virtual connection system in an asynchronous transfer mode, a switched virtual connection system for transferring at a constant peak rate, or some other system.

* * * * *